(12) United States Patent
Morinaga et al.

(10) Patent No.: US 7,916,660 B2
(45) Date of Patent: Mar. 29, 2011

(54) NOISE POWER ESTIMATION APPARATUS AND METHOD

(75) Inventors: Yasutaka Morinaga, Kawasaki (JP); Mikio Kuwahara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 117 days.

(21) Appl. No.: 12/360,355

(22) Filed: Jan. 27, 2009

(65) Prior Publication Data

US 2009/0213743 A1    Aug. 27, 2009

(30) Foreign Application Priority Data

Feb. 27, 2008  (JP) .................................. 2008-045453

(51) Int. Cl.
G08C 15/00     (2006.01)
H04L 1/00      (2006.01)

(52) U.S. Cl. ........................................................ 370/252

(58) Field of Classification Search ................... 370/252
See application file for complete search history.

(56) References Cited

U.S. PATENT DOCUMENTS

| 6,690,311 | B2* | 2/2004 | Lundin et al. ................ 341/120 |
| 7,023,938 | B1* | 4/2006 | Kapoor et al. ................ 375/350 |
| 2005/0286406 | A1* | 12/2005 | Jeon et al. .................... 370/208 |
| 2006/0062322 | A1* | 3/2006 | Namgoong et al. .......... 375/285 |
| 2006/0072524 | A1* | 4/2006 | Perahia et al. ................ 370/338 |

FOREIGN PATENT DOCUMENTS

| JP | 2004-533783 | 11/2004 |
| JP | 2005-328311 | 11/2005 |

* cited by examiner

*Primary Examiner* — Jason E Mattis
*Assistant Examiner* — Stephen J Clawson
(74) *Attorney, Agent, or Firm* — Brundidge & Stanger, P.C.

(57) ABSTRACT

A pilot signal is estimated by using the sampling theorem to estimate noise power in a stable manner without depending on the signal to noise ratio. A pilot signal estimation section obtains an estimated pilot signal by using the sampling theorem according to a plurality of received pilot signals sampled in the frequency domain by a sampling processor. A noise power estimation section estimates noise power by applying statistical averaging to the difference between the received pilot signal received from the sampling processor and the estimated pilot signal received from the pilot signal estimation section.

10 Claims, 6 Drawing Sheets

NOISE POWER ESTIMATION APPARATUS AND METHOD

BACKGROUND OF THE INVENTION

1. Field of the Invention

The present invention relates to noise power estimation apparatuses and methods, and more particularly, to a noise power estimation apparatus and method for estimating noise power and noise interference used for signal quality measurement in radio receivers in various radio communication systems such as orthogonal frequency division multiplexing access (OFDMA) communication systems.

2. Description of the Related Art

With the rapid progress of recent communication system technologies, it becomes necessary to estimate noise power in communication to calculate a channel quality indicator (CQI) since adaptive modulation or the like is used as a modulation technology. In addition, since an accurate CQI leads to an improvement in system performance, it is important that noise power be calculated accurately.

In a conventional code division multiple access (CDMA) system, for example, a base station adds a power control signal to a forward link (from the base station to a mobile terminal) signal and sends them to the mobile terminal to control the power of the mobile terminal in order to control the power of the reverse link (from the mobile terminal to the base station) To determine the power control signal, information about a signal to interference power ratio (SIR, a desired signal to interference ratio in power) estimated at the upstream receiver side is used. In general, the power level used for transmission from the mobile terminal to the base station corresponds to the lowest minimum receiving quality at the base station. This is for system stability and capacity improvement. If an excessive power level is used, it may cause extra interference or excessive traffic in the entire system, reducing the efficiency of the system.

In the conventional CDMA system, because the interference power I is sufficiently higher than the signal power S, the variance of a receiving signal is obtained to easily calculate the noise power (for example, see PCT International Patent Application Publication in Japanese NO. 2004-533783).

In a conventional OFDMA system, because the signal power S is higher than the interference power I, the method used in CDMA cannot be used. Consequently, a replica signal is generated from a received pilot signal and the noise power is estimated from the distance (shift) between the replica signal and the actually received signal point (see Japanese Unexamined Patent Application Publication No. 2005-328311).

SUMMARY OF THE INVENTION

In the conventional OFDMA system, when communication is made by quadrature phase shift keying (QPSK) or quadrature amplitude modulation (QAM), there is a symbol determination boundary for parallel-to-serial (P/S) conversion, and an expected receiving area enclosed by the boundary exists if the receiving point is seen in an in-phase quadrature (IQ) complex plane, respectively. When the expected area provides a signal-to-noise ratio (S/N) sufficient for receiving a signal, because the pilot signal, serving as a reference, is properly received at the expected area, noise can be estimated properly. If the S/N is low or fading influences greatly, however, a noise component may be added or a phase shift may occur, and the pilot signal may be received outside the expected area. In that case, it is difficult to estimate the noise power in a stable manner. In a low S/N region, which is not suited to adaptive modulation, a signal itself may have an error to greatly shift the receiving signal from the expected area, reducing noise estimation precision. Noise in a low S/N region may be able to be estimated when the noise estimation method used in the CDMA system, where the variance of the receiving signal is statistically obtained, is applied to the OFDMA system. However, this method cannot be applied to a high S/N region because there is almost no variance of noise. Further, frequency selectivity is provided for an OFDMA system where communication is made in a wide bandwidth, it cannot be determined whether the difference from a desired signal indicates a noise component or is caused by the influence of fading, making it difficult to estimate noise.

Therefore, in the OFDMA communication system, it is necessary to estimate noise power accurately without depending on the S/N, for stable noise power estimation without taking the magnitude of the S/N into account.

Accordingly, it is an object of the present invention to estimate noise power in a stable manner without depending on the S/N by performing pilot estimation by using the sampling theorem.

According to the first solving means of the present invention, there is provided a noise power estimation apparatus comprising:

a sampling processor for sampling a pilot signal on a complex plane at a constant sampling interval in a frequency domain to output a plurality of received pilot signals $r_m$, where m indicates an integer;

a pilot signal estimation section for estimating, according to the plurality of received pilot signals $r_m$ obtained by sampling in the frequency domain by the sampling processor, a received pilot signal $r_0$ having any frequency by using a plurality of pilot signals $r_m$ (m≠0) having other frequencies by the sampling theorem, which is used to reproduce frequency components included in a continuous signal as sampling data, to obtain an estimated received pilot signal $r_0'$; and a noise power calculator for applying statistical averaging to the difference between the received pilot signal $r_0$ having the any frequency, output from the sampling processor, and the estimated received pilot signal $r_0'$, estimated by the pilot signal estimation section;

wherein the noise power calculator, according to the following expression, $$\langle |r_0 - r_0'|^2 \rangle = \langle |n_0 - n_0'|^2 \rangle = \langle |n_0|^2 \rangle + \langle |n_0'|^2 \rangle = 2\sigma^2$$

where $\langle\ \rangle$ indicates an expected value, calculates the difference between the actually received pilot signal $r_0$ having the any frequency and the estimated received pilot signal $r_0'$ estimated by the pilot signal estimation section, and applies statistically averaging to the difference within a given period of time determined in advance to obtain variance $\sigma^2$ as the noise power.

According to the second solving means of the present invention, there is provided a noise power estimation method comprising the steps of:

sampling a pilot signal on a complex plane at a constant sampling interval in a frequency domain to output a plurality of received pilot signals $r_m$, where m indicates an integer;

pilot-signal-estimating for estimating, according to the plurality of received pilot signals $r_m$ obtained by sampling in the frequency domain by the sampling step, a received pilot signal $r_0$ having any frequency by using a plurality of pilot signals $r_m$ (m≠0) having other frequencies by the sampling theorem, which is used to reproduce frequency components included in a continuous signal as sampling data, to obtain an estimated received pilot signal $r_0'$; and noise-power-calculating for applying statistical averaging to the difference between the received pilot signal $r_0$ having the any frequency, output from the sampling step, and the estimated received pilot signal $r_0'$, estimated by the pilot-signal-estimating step;

wherein the noise-power-calculating step, according to the following expression, $$\langle |r_0 - r_0'|^2 \rangle = \langle |n_0 - n_0'|^2 \rangle = \langle |n_0|^2 \rangle + \langle |n_0'|^2 \rangle = 2\sigma^2$$

where < > indicates an expected value, calculates the difference between the actually received pilot signal $r_0$ having the any frequency and the estimated received pilot signal $r_0'$ estimated by the pilot-signal-estimating step, and applies statistically averaging to the difference within a given period of time determined in advance to obtain variance $\sigma^2$ as the noise power.

As described above, according to the present invention, the noise power of a desired signal can be estimated in a stable manner in any S/N regions irrespective of the magnitude of the S/N when the sampling theorem is satisfied.

According to the present invention, by using any window function when the sampling theorem is used, the number of samples necessary for calculation can be reduced to increase the calculation speed.

According to the present invention, noise power can be estimated to determine the S/N more accurately. In addition, that S/N information can be used for processes such as adaptive modulation method selection to contribute to an increase in throughput in the entire network irrespective of the magnitude of the S/N.

DESCRIPTION OF THE PREFERRED EMBODIMENTS

1. Sampling theorem

When the sampling-theorem condition is satisfied, if sampling is applied to received pilot signals, a particular pilot signal can be estimated by the sampling theorem by using other sampled pilot signals. The pilot component of a pilot signal ($r_0$) received at a particular time correlates with the pilot component of a pilot signal ($r_0'$) obtained when the pilot signal ($r_0'$) is estimated by the sampling theorem, and the difference between their power components is zero. Because noise components added to the individual signals have no correlation, the difference between the power of the received pilot signal and the power of the estimated pilot signal is statistically calculated to obtain the variance of noise, thereby allowing the noise power to be estimated.

The sampling theorem means that, to correctly reproduce the frequency components included in a continuous signal as sampling data, the sampling frequency should be twice or more of the maximum frequency of the continuous signal. A signal g(t) having the maximum frequency $f_0$ can be expressed by the following Expression 1.

$$g(t) = \sum_{k=-\infty}^{\infty} g\left(\frac{k}{2f_0}\right) \frac{\sin\left[2\pi f_0\left(t - \frac{k}{2f_0}\right)\right]}{2\pi f_0\left(t - \frac{k}{2f_0}\right)} \quad (\text{式 1})$$

It is known that the number of samples used in the sampling theorem can be reduced by using any window function. When this fact is applied to the present invention, the number of pilot signals necessary for calculation can be reduced.

2. Receiver that Includes a Noise Power Estimation Section (Apparatus)

Figure 1:
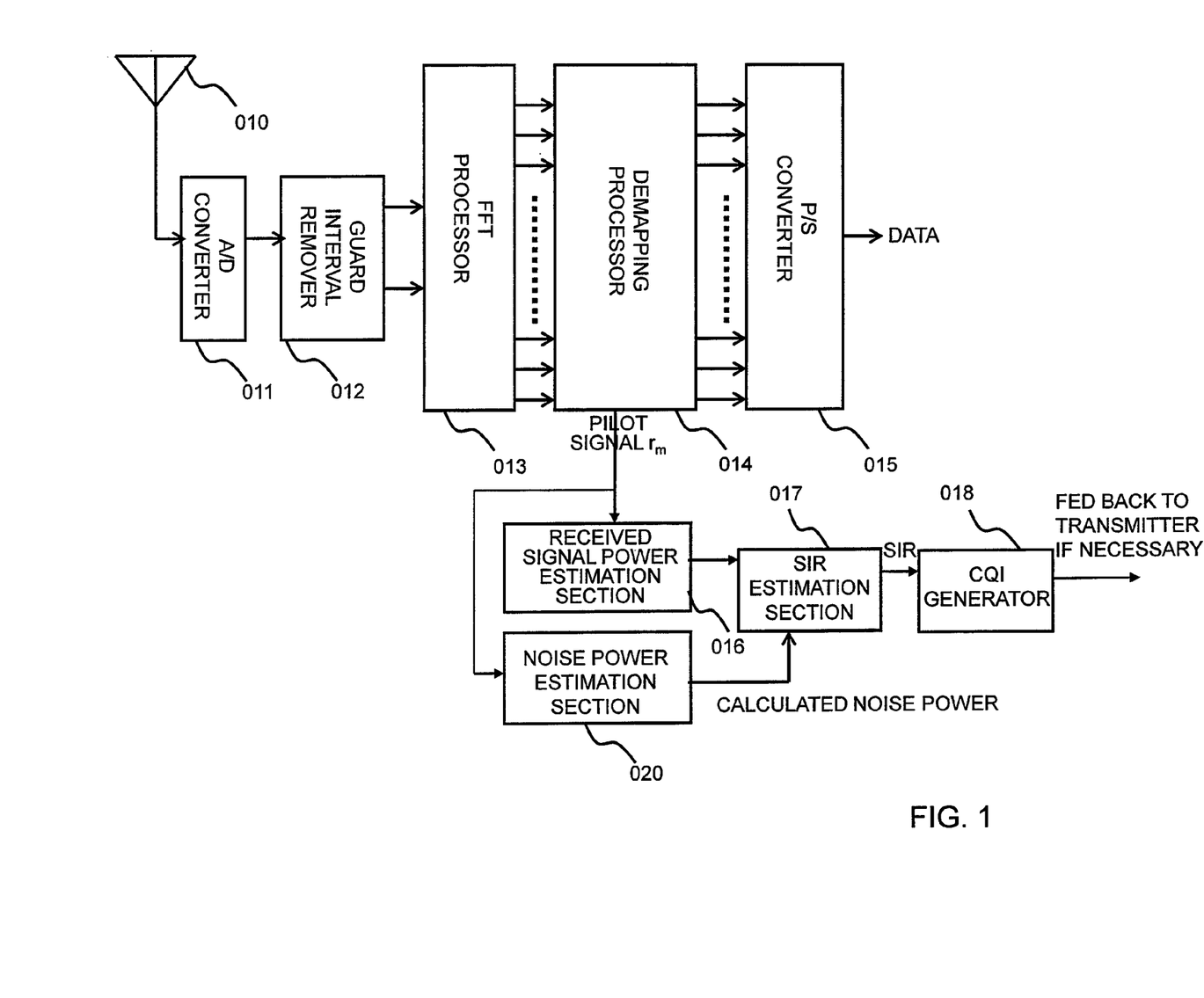
FIG. 1 is a functional block diagram of a receiver that includes a noise power estimation section (apparatus) according to an embodiment of the present invention.

FIG. 1 is a function block diagram of a receiver (demodulator) that includes a noise power estimation section (apparatus) according to an embodiment of the present invention. The receiver can be used especially in OFDMA systems. The receiver includes an antenna 010, an analog-to-digital (A/D) converter 011, a guard interval remover 012, a fast Fourier transform (FFT) processor 013, a demapping processor 014 to a complex plane, a parallel-to-serial (P/S) processor 015, a received signal power estimation section 016, a signal-to-interference power ratio (SIR) estimating section 017, a channel quality indicator (CQI) generator 018, and a noise power estimation section 020.

The antenna 010 receives a signal sent from a transmitter. The antenna 010 can also be used for signal transmission.

The A/D converter 011 converts the signal received by the antenna 010, which is analog, to a digital signal.

The guard interval remover 012 removes a guard interval given by the transmitter. In order to enhance immunity against a delay wave in OFDM, a cyclic prefix is, for example, used as a guard interval.

Figure 6:
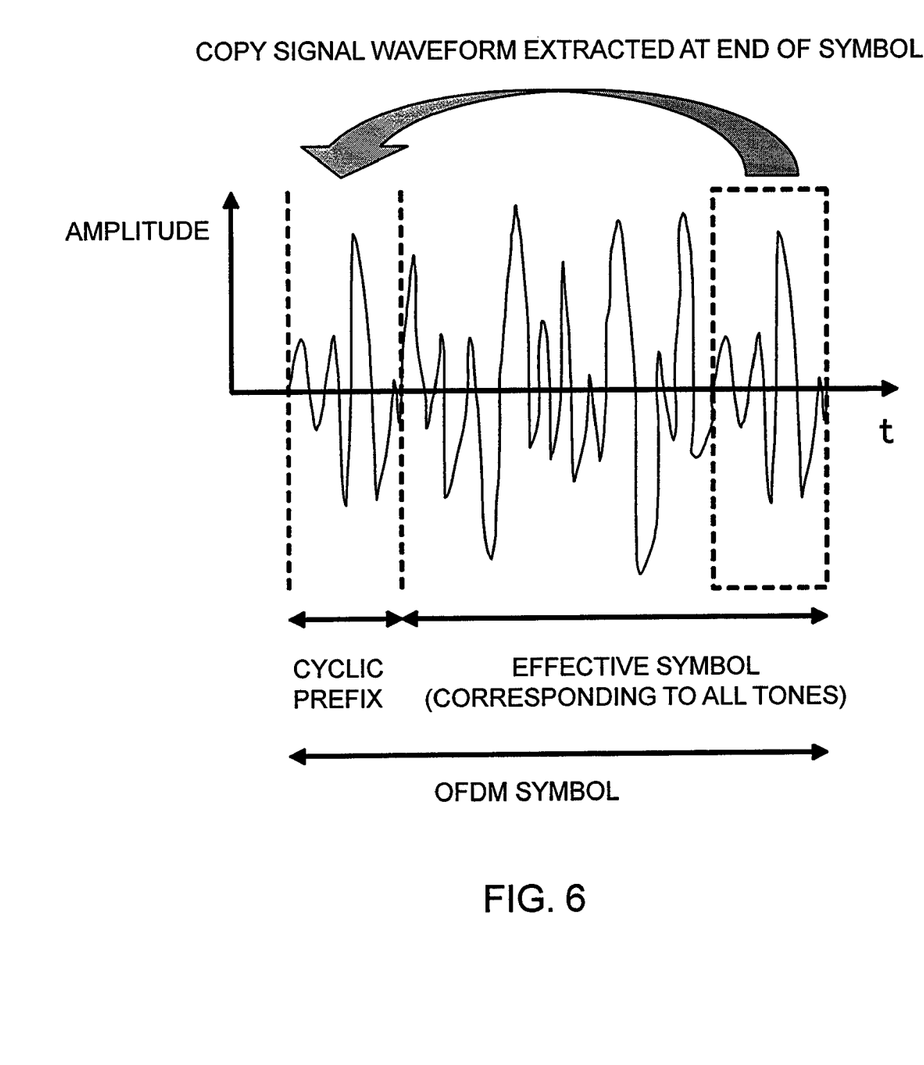
FIG. 6 shows a cyclic prefix used as a guard interval.

FIG. 6 shows the cyclic prefix used as a guard interval. As shown in FIG. 6, the cyclic prefix is a copy added to the top of an OFDM symbol, of a part of the signal waveform extracted at an end portion of the OFDM symbol. In FIG. 6, a portion indicated as an effective symbol is the original OFDM symbol (before the cyclic prefix was added), and this portion is necessary for demodulation. This portion is converted (divided into subcarriers) to the frequency domain by fast Fourier transform (by the FFT processor 013 in the present embodiment). Only one period of the original OFDM symbol (any portion having the effective symbol length, of the OFDM symbol) needs to be obtained. Therefore, the cyclic prefix is a redundant signal portion and can be discarded by the receiver.

The FFT processor 013 applies fast Fourier transform to the input signal to convert (divide) it to signals in the frequency domain.

The demapping processor 014 maps the signals in the frequency domain output from the FFT processor 013 onto the complex plane for each subcarrier and also extracts a pilot signal inserted for each subcarrier.

The P/S converter 015 converts a parallel signal to a serial signal. The P/S converter 015 converts multiple-value signals (such as those in QPSK, QAM, or the like) expressed in the complex plane by demapping in the demapping processor 014 to a binary data signal.

The received signal power estimation section 016 estimates the power of the received signal by using the pilot signal received from the demapping processor 014 as a reference. The power of the received signal depends on the magnitude of the pilot signal. (For example, the pilot signal can be multiplied by a given value that indicates the power of the received signal to estimate the power of the received signal. This given value may be determined in advance, or may be specified in the received signal and read and used.) Therefore, the power of the pilot signal can be measured to estimate the power of the received signal.

The noise power estimation section 020 estimates noise power from the pilot signal received from the demapping processor 014. Noise power estimation according to the present embodiment, performed by the noise power estimation section 020 will be described in detail later in "3. Noise power estimation".

The SIR estimation section 017 estimates the SIR of the signal from the power of the received signal, estimated by the received signal power estimation section 016 and the noise power estimated by the noise power estimation section 020.

The CQI generator 018 selects an index corresponding to the receiving quality according to the SIR received from the SIR estimation section 017. Depending on the transfer condition of the transmission path, this index is fed back to the transmitter to change the modulation method and the transmission rate.

3. Noise Power Estimation

Figure 2:
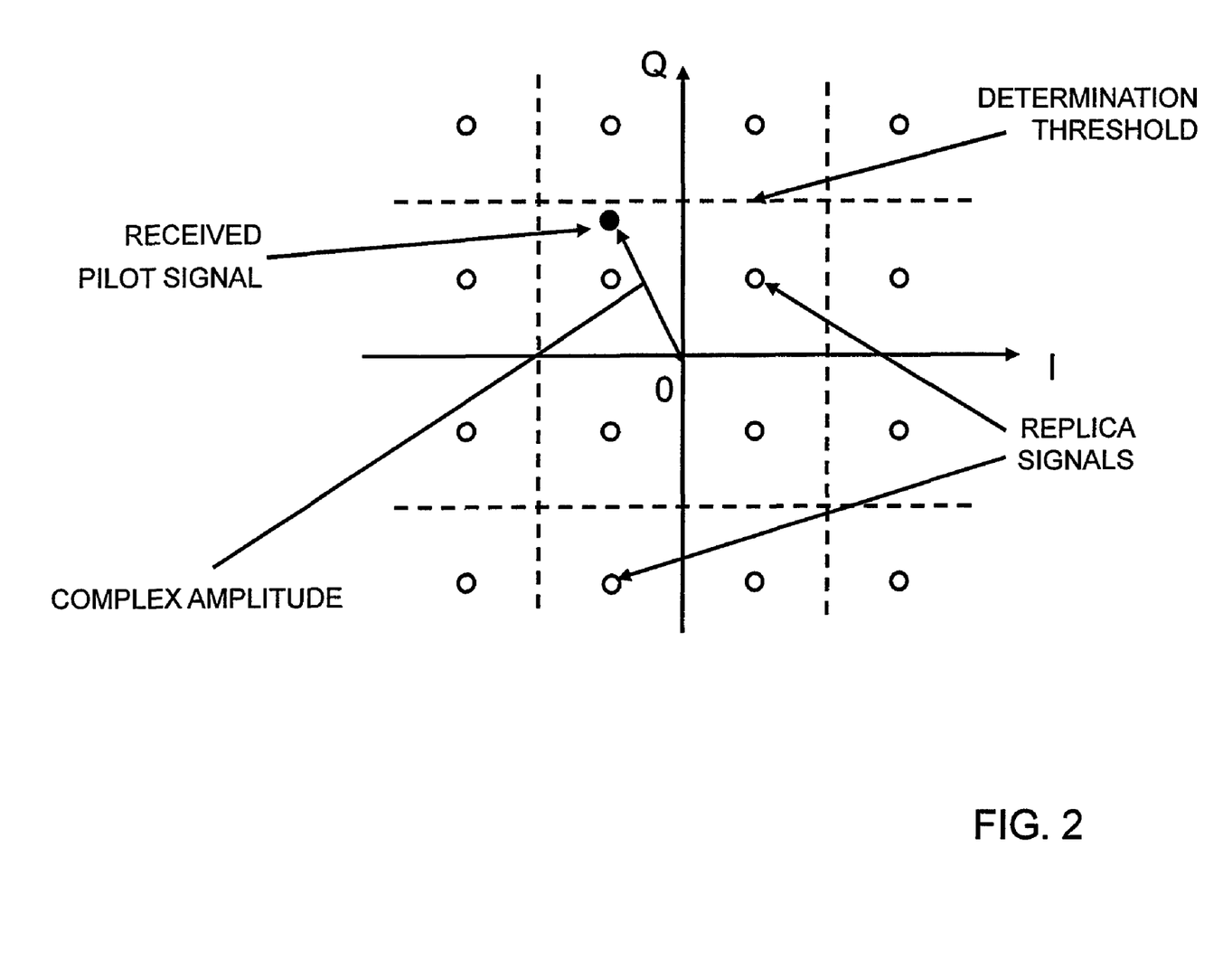
FIG. 2 shows boundaries in a complex plane, serving as determination references in parallel to serial conversion, a received pilot signal, and replica signals generated from the pilot signal.
Figure 3:
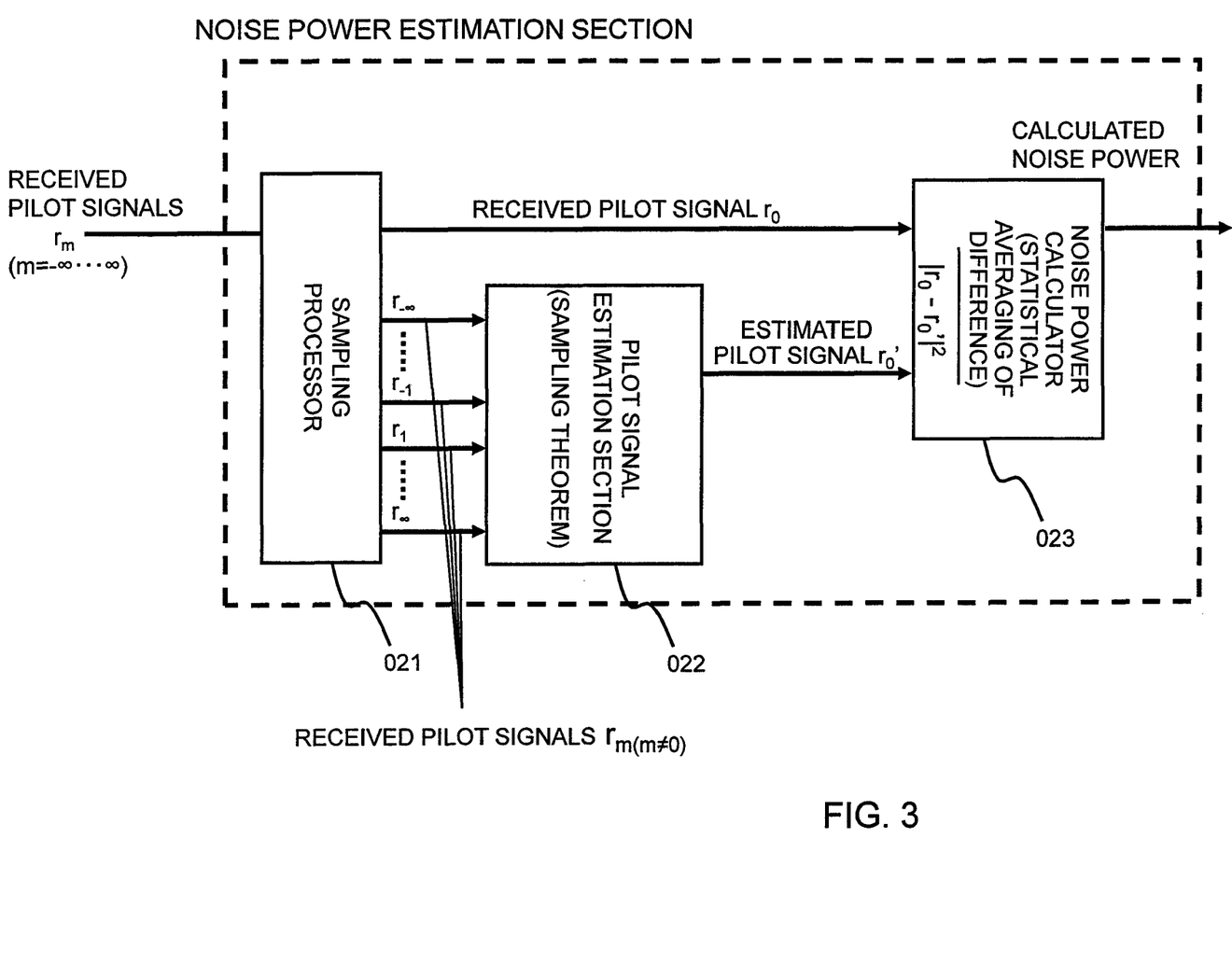
FIG. 3 shows the structure of the noise power estimation section.
Figure 4:
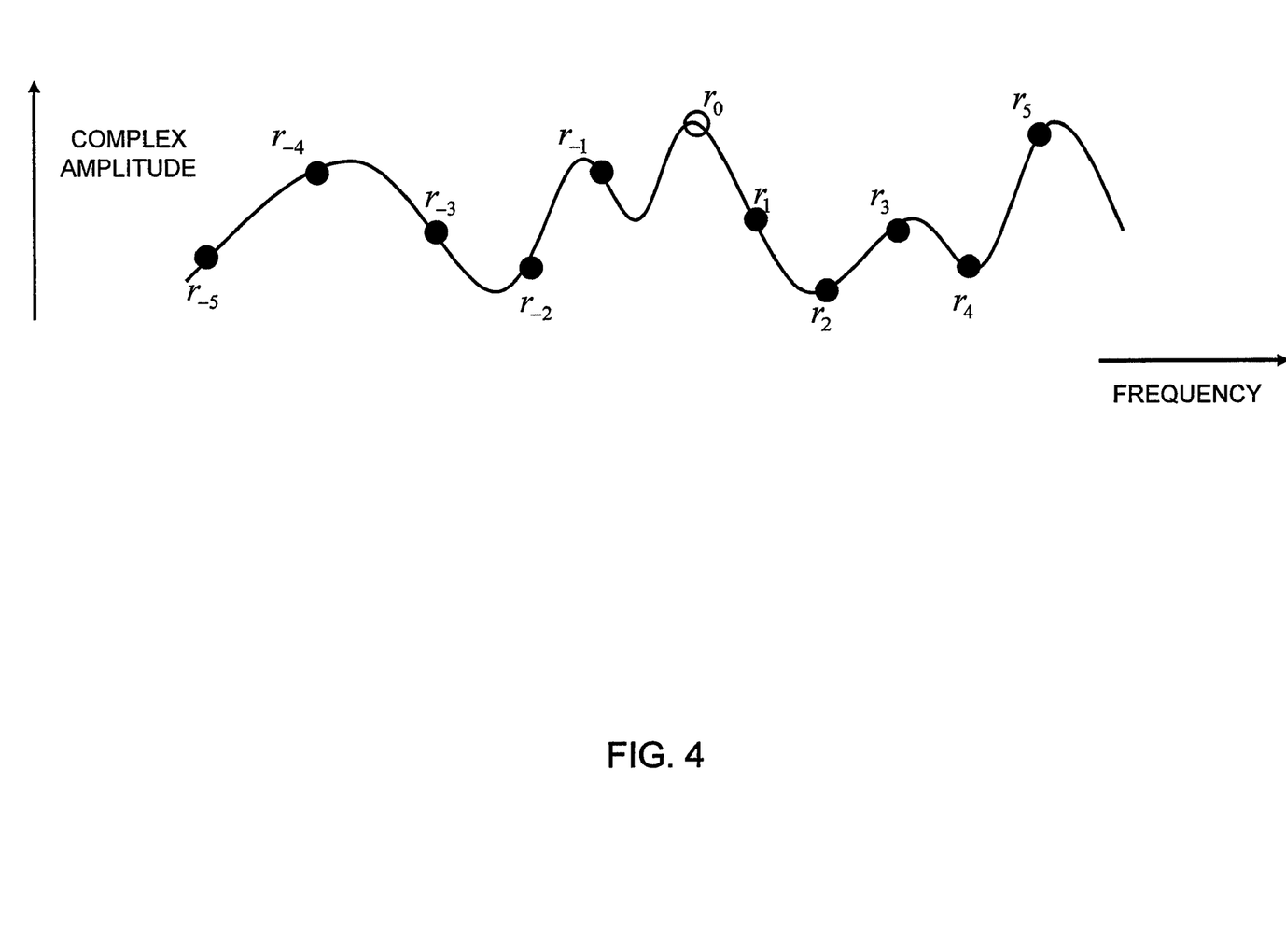
FIG. 4 shows the complex amplitude of the received pilot signal.

FIG. 3 shows the structure of the noise power estimation section 020. FIG. 2 shows boundaries in the complex plane, serving as determination references in the P/S conversion, a received pilot signal, and replica signals generated from the pilot signal. FIG. 4 shows the complex amplitude of the received pilot signal.

The processing performed by the noise power estimation section 020 will be described below in detail with reference to FIG. 3.

The noise power estimation section 020 includes a sampling processor 021, a pilot signal estimation section 022, and a noise power calculator 023. The sampling processor 021 samples the pilot signal received from the demapping processor 014 at a constant sampling interval in the frequency domain. The sampling interval is shorter than the maximum delay spread of the signal because the condition under which the sampling theorem used by the pilot signal estimation section 022 is satisfied needs to be met. The pilot signal on the complex plane, shown in FIG. 2, is sampled and shown in complex amplitude as in FIG. 4. Since the pilot signal includes a noise component, the received pilot signal $r_m$ can be defined as in the following Expression 2, where $s_m$ indicates the complex amplitude of the pilot signal, $n_m$ indicates the complex amplitude of noise added to the pilot signal, and m indicates the sample number assigned with the sample of any received pilot signal used as a reference.

$$r_m = s_m + n_m \quad (m = -\infty \ldots \infty) \tag{式2}$$

The pilot signal estimation section 022 estimates a received pilot signal $r_0$ having a certain frequency by the sampling theorem by using the other received pilot signals $r_m$ ($m = -\infty, \ldots, -1, 1, \ldots, \infty$) having corresponding frequencies, sampled by a frequency interval and outputs an estimated pilot signal $r_0'$. It is assumed here as shown in FIG. 4 that information about odd points is used to estimate the received pilot signal $r_0$ by the sampling theorem. The estimated pilot signal $r_0'$ can be expressed by the following Expression 3.

$$r_0' = s_0 + n_0' = \sum_{m=-\infty, m\neq 0}^{\infty} \{\mathrm{sinc}(m/2) \times r_m\} \tag{式3}$$

In actual implementation, the range from $-\infty$ to $\infty$ can be set to a given finite value range determined in advance from $-M$ to $M$ as shown in the following Expression 3'.

$$r_0' = s_0 + n_0' = \sum_{m=-M, m\neq 0}^{M} \{\mathrm{sinc}(m/2) \times r_m\} \tag{式3'}$$

where M indicates a predetermined integer.

It is generally known that the number of samples can be reduced by using a window function when the sampling theorem is used. Any window function can be used. As an example, a Kaiser window ($\alpha=4$) is used to apply the sampling theorem. Another window function can be used in the present embodiment.

$$r_0' = s_0 + n_0' = \sum_{\substack{m=-2N \\ m\neq 0}}^{2N} \left\{\mathrm{sinc}(m/2) \frac{I_0\left(4\sqrt{1-\left(\frac{m}{2N+1}\right)^2}\right)}{I_o(4)} \times r_m\right\} \tag{式4}$$

where $I_0$ indicates the first type zeroth-order conversion Bessel function and N depends on the number of samples.

In specific sampling processing (including Expressions 3, 3' and 4), only information about odd points or only information about even points may be used, information about points disposed at predetermined intervals may be used, or the number of information points used may be determined in advance. Such specific sampling processing and a process performed with a window function can be determined in advance by the sampling processor 021 and/or the pilot signal estimation section 022.

The noise power calculator 023 calculates the statistical average of the difference between the actually received pilot signal $r_0$ and the estimated received pilot signal $r_0'$ estimate by the pilot signal estimation section 022 to estimate the noise power.

Figure 5:
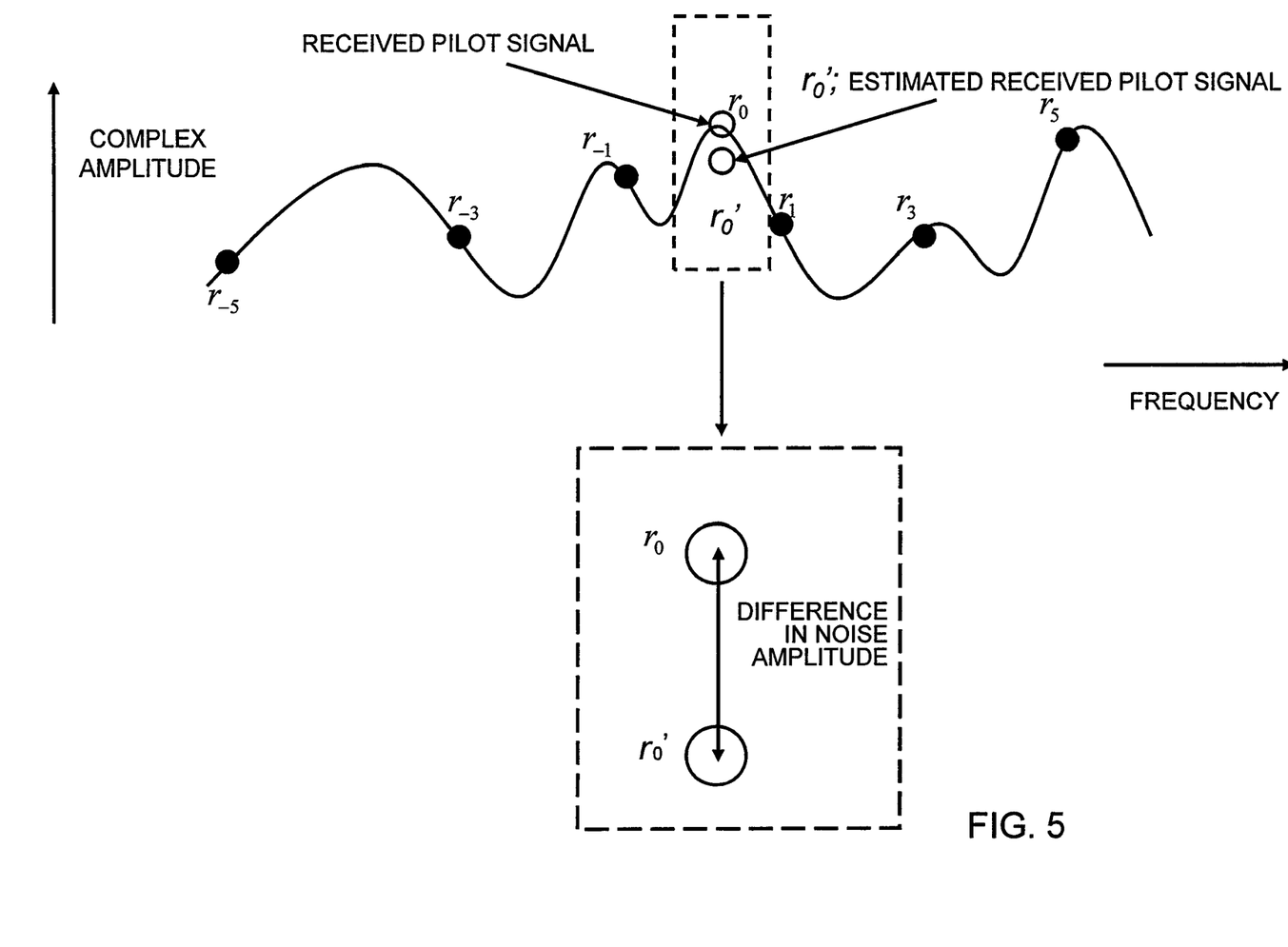
FIG. 5 shows the received pilot signal and an estimated pilot signal in an amplitude plane.

FIG. 5 shows the received pilot signal and the estimated pilot signal in an amplitude plane. Under a condition where the sampling theorem is satisfied, the received pilot signal $r_0$ and the estimated pilot signal $r_0'$ have correlated pilot components and noise components having no correlation are added to the signals. Therefore, a difference in complex amplitude occurs as shown in FIG. 5. By removing the complex amplitude so of the pilot signal from the difference between the estimated value $r_0'$ and the measured value $r_0$ of the received pilot signal, only the difference between the noise components can be extracted, as shown in FIG. 5.

$$r_0 - r_0' = s_0 + n_0 - (s_0 + n_0') = n_0 - n_0' \tag{式5}$$

Since the statistical averages of the noise components are zero, taking statistics by Expression 5 generates the following Expressions 6 and 7, where the expected value of the difference $|r_0 - r_0'|$ or $|r_0 - r_0'|^2$ between the estimated value and the measured value of the received pilot signal can be regarded as zero.

$$\langle |r_0-r_0'| \rangle = \langle |n_0-n_0'| \rangle = 0 \quad (式6)$$

$$\langle |r_0-r_0'|^2 \rangle = \langle |n_0-n_0'|^2 \rangle = \langle |n_0|^2 \rangle + \langle |n_0'|^2 \rangle = 2\sigma^2 \quad (式7)$$

where < > indicates the expected value.

The number of sampling times in time can be set, for example, to 100 (time $t_1$ to $t_{100}$ for $r_0$ and $r_0'$) or to 100 or more. This number can be specified appropriately. The noise power calculator 023 can calculate the resultant statistical value of Expression 7 and divide the value by 2 to obtain the variance $\sigma^2$ as the noise power. In other words, the noise power calculator 023 can calculate $|r_0-r_0'|^2$ a predetermined number of sampling times as statistical values according to Expression 7, calculate the average thereof, and divide the average by 2 to obtain the variance $\sigma^2$. Assuming that $\langle |n_0|^2 \rangle$ nearly equals $\langle |n_0'|^2 \rangle$ in Expression 7, the variance $\sigma^2$ equals $\langle |n_0|^2 \rangle$. Therefore, the noise power calculator 023 can divide the average of the obtained $|r_0-r_0'|^2$ to obtain the noise power ($|n_0|^2$) (that is, to obtain the variance $\sigma^2$ as the noise power).

As an example specific configuration for the statistical averaging process of the difference, a table for storing $|r_0-r_0'|^2$ for each time is provided inside or outside the noise power calculator 023; the noise power calculator 023 calculates $|r_0-r_0'|^2$ from the input $r_0$ and $r_0'$ and stores the calculated value in the table in association with the time; and the noise power calculator 023 reads the calculated value for the time corresponding to each of the predetermined number of sampling times (for example, 100 for $t_1$ to $t_{100}$), and calculates the average thereof to perform the statistical averaging process of the difference. At the next time (for example, $t_{101}$), the noise power calculator 023 can shift and read the calculated values for the preceding predetermined number of sampling times (for example, 100 for $t_2$ to $t_{101}$), stored in the table, to execute the statistical averaging process of the difference in the same way.

The present embodiment is just an embodiment of the present invention. The present invention is not limited to the present embodiment.

In the present embodiment, the antenna 010 used for receiving a signal has just one antenna. The present invention can also be applied to a case where a plurality of antennas, such as multi-input-multi-output (MIMO) antennas, is employed. In the present embodiment, the information about SIR estimated by the SIR estimation section 017 is sent only to the CQI generator 018. This information can be output to another apparatus for another process. For example, a minimum mean squared error (MMSE) estimation section used for MIMO antennas or the like is used as the other apparatus to apply to a plurality of antennas, or a log likelihood ratio (LLR) calculator for a bit sequence is used as the other apparatus to calculate the LLR.

The present invention can be implemented by either hardware or software.

What is claimed is:

1. A noise power estimation apparatus comprising:
   a sampling processor for sampling a pilot signal on a complex plane at a constant sampling interval in a frequency domain to output a plurality of received pilot signals $r_m$, where m indicates an integer;
   a pilot signal estimation section for estimating, according to the plurality of received pilot signals $r_m$ obtained by sampling in the frequency domain by the sampling processor, a received pilot signal $r_0$ having any frequency by using a plurality of pilot signals $r_m$ ($m \neq 0$) having other frequencies by a sampling theorem, which is used to reproduce frequency components included in a continuous signal as sampling data, to obtain an estimated received pilot signal $r_0'$; and
   a noise power calculator for applying statistical averaging to the difference between the received pilot signal $r_0$ having the any frequency, output from the sampling processor, and the estimated received pilot signal $r_0'$, estimated by the pilot signal estimation section;
   wherein
   the noise power calculator, according to the following expression, $$\langle |r_0-r_0'|^2 \rangle = \langle |n_0-n_0'|^2 \rangle = \langle |n_0|^2 \rangle + \langle |n_0'|^2 \rangle = 2\sigma^2$$

< >: an expected value
   $n_0$: noise component of received pilot signal
   $n_0'$: noise component of estimated pilot signal,
   calculates the difference between the actually received pilot signal $r_0$ having the any frequency and the estimated received pilot signal $r_0'$ estimated by the pilot signal estimation section, and applies statistical averaging to the difference within a given period of time determined in advance to obtain variance $\sigma^2$ as the noise power.

2. A noise power estimation apparatus according to claim 1, wherein the pilot signal estimation section uses the following expression as the sampling theorem to obtain the estimated received pilot signal $r_0'$, $$r_0' = s_0 + n_0' = \sum_{m=-\infty, m \neq 0}^{\infty} \{\operatorname{sinc}(m/2) \times r_m\}$$

where m falls in a predetermined definite range.

3. A noise power estimation apparatus according to claim 1, wherein the pilot signal estimation section uses information about definite odd points in the frequency domain to obtain the estimated received pilot signal $r_0'$ by the sampling theorem.

4. A noise power estimation apparatus according to claim 1, wherein the sampling processor or the pilot signal estimation section uses any window function when the sampling theorem is used to reduce the number of pilot signals necessary for the sampling theorem.

5. A noise power estimation apparatus according to claim 1, wherein the noise power is estimated in an orthogonal frequency division multiplexing access (OFDMA) communication system.

6. A noise power estimation apparatus according to claim 1, further comprising a guard interval remover for removing guard intervals given by a transmitter to the received signal.

7. A noise power estimation apparatus according to claim 1, further comprising:
   a fast Fourier transform (FFT) processor for applying fast Fourier transform to the received signal to convert it to subcarrier signals in the frequency domain; and
   a demapping processor for mapping the subcarrier signals in the frequency domain divided by the FFT processor to signals having amplitudes in the complex plane for subcarriers, obtaining a plurality of pilot signals in the frequency domain, and outputting the plurality of pilot signals to the sampling processor.

8. A noise power estimation apparatus according to claim 7, further comprising:
a received signal power estimation section for estimating power of the received signal by using the plurality of pilot signals received from the demapping processor as references; and
a signal-to-interference power ratio (SIR) estimation section for estimating the SIR of the signal by using the power of the received signal estimated by the received signal power estimation section and the noise power estimated by the noise power estimation section.

9. A noise power estimation apparatus according to claim 1, wherein the pilot signal estimation section uses the following expression as the sampling theorem, $$r'_0 = s_0 + n'_0 = \sum_{m=-M, m \neq 0}^{M} \{\mathrm{sinc}(m/2) \times r_m\}$$

where M is a predetermined integer,
to obtain the estimated received pilot signal $r_0'$.

10. A noise power estimation method in a receiver or a demodulator that includes a noise power estimation section, the noise power estimation section executes the steps of:
sampling a pilot signal on a complex plane at a constant sampling interval in a frequency domain to output a plurality of received pilot signals $r_m$, where m indicates an integer;
pilot-signal-estimating for estimating, according to the plurality of received pilot signals $r_m$ obtained by sampling in the frequency domain by a sampling step, a received pilot signal $r_0$ having any frequency by using a plurality of pilot signals $r_m$ (m ≠0) having other frequencies by a sampling theorem, which is used to reproduce frequency components included in a continuous signal as sampling data, to obtain an estimated received pilot signal $r_0'$; and
noise-power-calculating for applying statistical averaging to the difference between the received pilot signal $r_0$ having the any frequency, output from the sampling step, and the estimated received pilot signal $r_0'$, estimated by the pilot-signal-estimating step;
wherein
the noise-power-calculating step, according to the following expression, $$\langle |r_0 - r_0'|^2 \rangle = \langle |n_0 - n_0'|^2 \rangle = \langle |n_0|^2 \rangle + \langle |n_0'|^2 \rangle = 2\sigma^2$$

< >: an expected value
$n_0$: noise component of received pilot signal
$n_0'$: noise component of estimated pilot signal,
calculates the difference between the actually received pilot signal $r_0$ having the any frequency and the estimated received pilot signal $r_0'$ estimated by the pilot-signal-estimating step, and applies statistical averaging to the difference within a given period of time determined in advance to obtain variance $\sigma^2$ as the noise power estimation.

* * * * *